United States Patent [19]

Dohm

[11] 4,189,280
[45] Feb. 19, 1980

[54] WINDMILL

[76] Inventor: Grant G. Dohm, Grinnell, Kans. 67738

[21] Appl. No.: 851,976

[22] Filed: Nov. 16, 1977

[51] Int. Cl.² .............................................. F03D 7/06
[52] U.S. Cl. ........................................ 415/2; 415/146
[58] Field of Search ....................................... 415/2-4, 415/146; 290/44, 55

[56] References Cited

U.S. PATENT DOCUMENTS

| | | | |
|---|---|---|---|
| 310,237 | 1/1885 | Wegley | 415/4 |
| 648,442 | 5/1900 | Scott | 415/4 |
| 658,129 | 9/1900 | Steude | 415/2 |
| 698,409 | 4/1902 | Neuser | 415/4 |
| 739,394 | 9/1903 | Crow | 415/2 |
| 978,433 | 12/1910 | Coleman | 415/2 |
| 1,455,950 | 5/1923 | Willman | 415/2 |
| 1,463,924 | 8/1923 | Ozaki | 415/2 X |
| 1,534,799 | 4/1925 | Maine | 415/2 |
| 3,986,786 | 10/1976 | Sellman | 415/2 |
| 4,057,279 | 11/1977 | Lebost | 415/2 |
| 4,070,131 | 1/1978 | Yen | 415/3 |
| 4,127,356 | 11/1978 | Murphy | 415/2 |

FOREIGN PATENT DOCUMENTS

| | | | |
|---|---|---|---|
| 2505945 | 8/1976 | Fed. Rep. of Germany | 415/2 |
| 380643 | 10/1907 | France | 415/3 |
| 501843 | 4/1920 | France | 415/2 |
| 527416 | 10/1921 | France | 415/4 |
| 530634 | 12/1921 | France | 415/2 |
| 185939 | 9/1922 | United Kingdom | 415/2 |

*Primary Examiner*—Everette A. Powell, Jr.

*Attorney, Agent, or Firm*—Burton & Dorr

[57] ABSTRACT

This invention involves a windmill apparatus and method of operation therefor. The windmill has a mirror-image pair of blade assemblies mounted for rotation about a common horizontal axis. Each blade assembly has a vortex creating or directing means positioned substantially thereabout which serves to channel the incoming wind about the horizontal axis to create a vortex of whirling winds. The creation of the vortex intensifies the driving force of the incoming wind to increase the rotational velocity of each blade assembly and the efficiency of the windmill. A common aligning means for the pair of blade assemblies serves to continuously align the windmill into the incoming wind with the horizontal, rotational axis of each blade assembly substantially perpendicular to the direction of the incoming wind. A back portion of each directing means has an upper section that captures a part of the incoming wind above the closed path of rotation of each blade assembly and deflects it downwardly to strike the blade members in each assembly at a substantially right angle to create a high torque force thereon. The invention also includes a governor arrangement responsive to increases in the force of the incoming wind above a predetermined amount. The method of the present invention includes the steps of mounting a plurality of blade members for rotation about an axis and directing the incoming wind about that axis to create a vortex of whirling winds to drive the blade members of each assembly.

9 Claims, 9 Drawing Figures

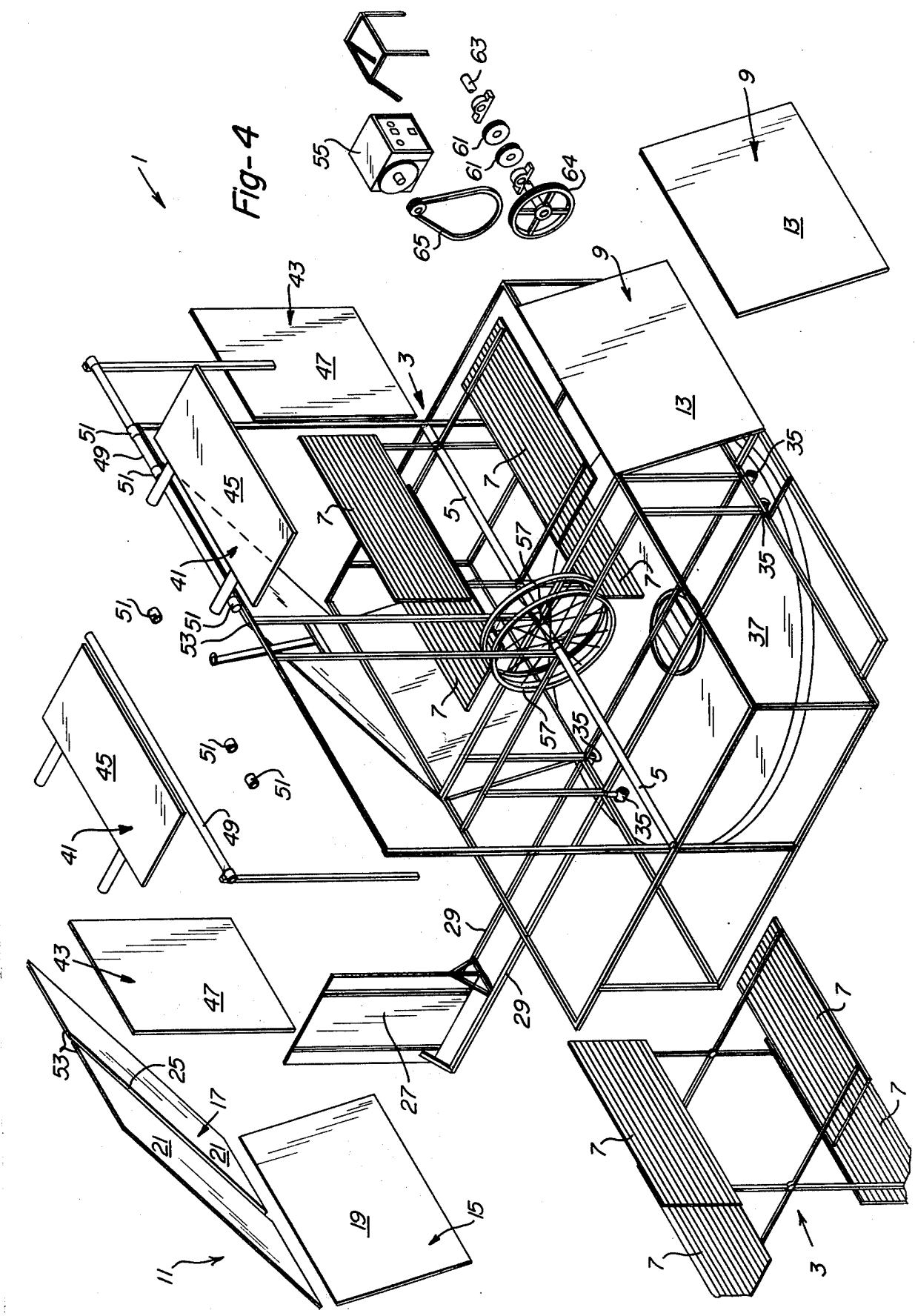

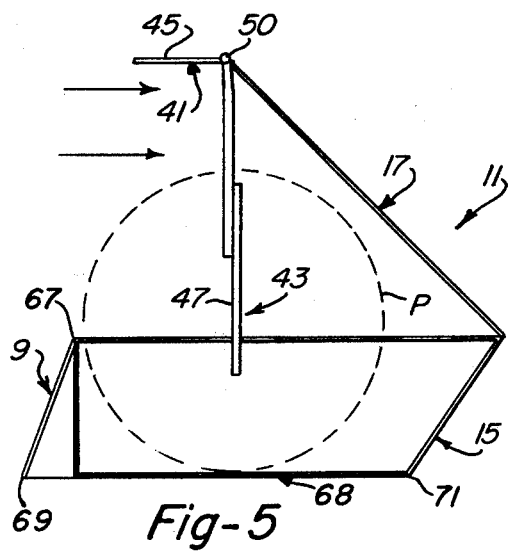
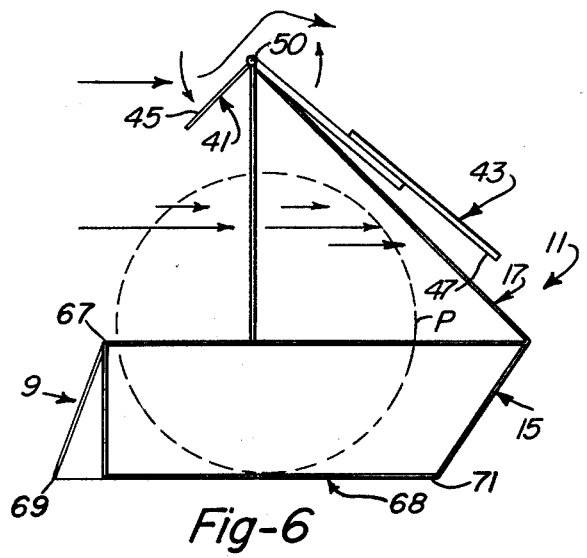
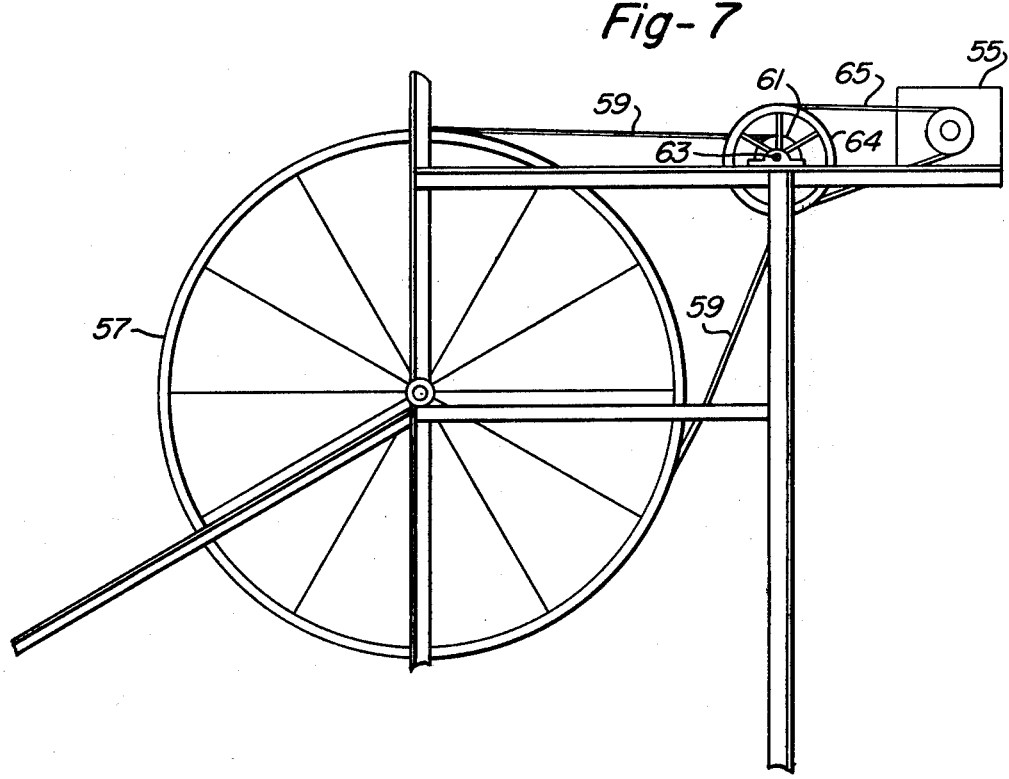

WINDMILL

FIELD OF INVENTION

This invention relates to the field of windmills, wind motors, wind impellers, wind turbines, and like apparatus and methods that use wind as the power source to drive one or more rotatably mounted blade assemblies.

BACKGROUND OF THE INVENTION

Wind is a cheap, abundant, and clean source of energy. Windmills and other wind-driven motors have been widely used in urban and rural areas for years. Although their use as an energy source has greatly diminished with the advent of electricity and portable motors powered by petroleum derivatives, windmills are becoming increasingly more popular as the price of alternate sources of energy rises. The pollution-free aspect of wind-driven motors has also greatly contributed to their increased popularity.

Windmills are particularly adaptable to drive electric generators. The high annular velocity that windmills can produce enables them to effectively compete with other energy sources in the production of electric power. This is especially true in remote areas. Windmills are also widely used in rural areas to drive mechanical devices as for example pumps which raise water to the surface for livestock ponds.

Efficiency, simplicity of design, strength, and the cost of construction and maintenance are important factors in any windmill operation. The ability to protect the windmill from the destructive force of excessively high winds is also paramount. By far, the most common windmill design involves a rotatably mounted blade assembly that is continuously aligned in a predetermined relationship to the incoming wind by a tail rudder. In these designs, no attempt is made to direct or channel the incoming wind in such a manner as to create a vortex of whirling winds about the blade members in order to intensify the driving force of the wind and thereby increase the rotational velocity and efficiency of the windmill. The windmill of the present invention directs or channels the incoming wind to create such a vortex of whirling winds about the blade members and uses a design that is simple, strong, inexpensive to build and maintain, and includes a governor arrangement to protect the blade assemblies from the destructive force of excessively high winds. The governor of the present invention incrementally deflects more wind away from the blade assembly as the force of the incoming wind progressively increases above a predetermined amount.

SUMMARY OF THE INVENTION

This invention involves a windmill apparatus and method of operation whereby the force of incoming linearly moving wind is transformed into rotational motion. The apparatus of the present invention includes a windmill with a mirror-image pair of blade assemblies mounted for rotation about a common horizontal axis. A tail rudder continuously aligns the windmill into the incoming wind with the horizontal axis of rotation substantially perpendicular thereto. Directing means with front and back portions are supported in fixed relationship to each blade assembly and extend substantially thereabout. Each directing means serves to direct or channel the incoming wind about the rotational axis of the respective blade assembly to create a vortex of whirling winds. The creation of the vortex intensifies the driving force of the wind to increase the rotational velocity of each of the blade assemblies and the efficiency of the windmill.

The back portion of each directing means is substantially concave shaped and positioned downwind of the rotational axis. The front portion is substantially planar and positioned upwind of the rotational axis. Each back portion extends upwardly above the closed path of the rotating blade members of the respective assembly and has a planar section inclined into the wind at a substantially 45° angle. This planar section captures a part of the incoming wind and deflects it downwardly to strike the blade members at a substantially right angle near the circumference of the closed path of the rotating blade members. In this manner, a high torque force is applied to the blade members. A governor arrangement is also supported in a fixed relationship to the rotational axis and serves to deflect progressively more of the incoming wind away from the blade assemblies as the force of the wind progressively increases above a predetermined amount. With the governor arrangement, the windmill is protected from the destructive force of excessively high winds.

The method of the present invention involves the steps of mounting a plurality of blade members for rotation about an axis and directing the incoming wind about the axis to create a vortex of whirling winds to cause the blade members to rotate. The directing step intensifies the driving force of the incoming wind and increases the efficiency of the windmill. The method also includes the steps of capturing a portion of the incoming wind beyond the closed path of the rotating blade members and directing it along a path to strike the blade members at a right angle. The method further recites the steps of sensing the force of the incoming wind and deflecting a portion of it away from the blade members when the force increases above a predetermined amount. These last steps serve to protect the windmill from the destructive force of excessively high winds and progressively more wind is deflected away from the blade members as the force of the incoming wind increases.

OBJECTS OF THE INVENTION

It is an object of this invention to provide a new and novel windmill apparatus and method of operation that is simple in design, inexpensive to build and maintain, strong, and efficient.

It is an object of this invention to provide a new and novel windmill apparatus and method of operation which directs the incoming wind about the rotational axis of the blade members to create a vortex of whirling winds. This vortex of whirling winds serves to intensify the driving force of the incoming wind and to increase the rotational velocity and efficiency of the windmill.

Another object of this invention is to provide a new and novel windmill apparatus and method of operation which includes a governor arrangement to deflect progressively more of the incoming wind away from the blade members as the force of the incoming wind progressively increases above a predetermined amount. In this manner, the windmill is protected from the destructive force of excessively high winds.

It is an object to provide a new and novel windmill apparatus and method of operation that captures a portion of the incoming wind away from the closed path of the rotating blade members and directs the captured portion to strike the blade members at a substantially 90° angle at a location near the circumference of the closed path. In this manner, a high torque force is applied to the blade members.

Another object is to provide a new and novel windmill apparatus and method of operation which includes a pair of mirror-image blade assemblies mounted for rotation about a common horizontal axis in which the power-takeoff means is centrally located between them to balance the forces.

Additional objects as well as features and advantages of this invention will become evident from the descriptions set forth hereinafter when considered in conjunction with the accompanying drawings.

BRIEF DESCRIPTION OF THE DRAWINGS

FIG. 4 is an exploded view of the invention illustrating the various parts thereof.

FIG. 5 is a view along the horizontal axis of rotation of the blade assemblies illustrating the position of the governor arrangement during normal operation of the windmill.

FIG. 6 is a view similar to FIG. 5 illustrating the manner in which the incoming wind will cause the governor arrangement to pivot about its horizontal axis to progressively deflect more of the incoming wind away from the blade assemblies when the force of the incoming wind exceeds a predetermined amount.

FIG. 7 shows the power-takeoff means of the windmill in which the rotational motion of the blade assemblies is transferred from a large wheel to a smaller wheel and then to an electric generator by means of an arrangement of belts.

DETAILED DESCRIPTION OF THE PREFERRED EMBODIMENTS

Figure 1:
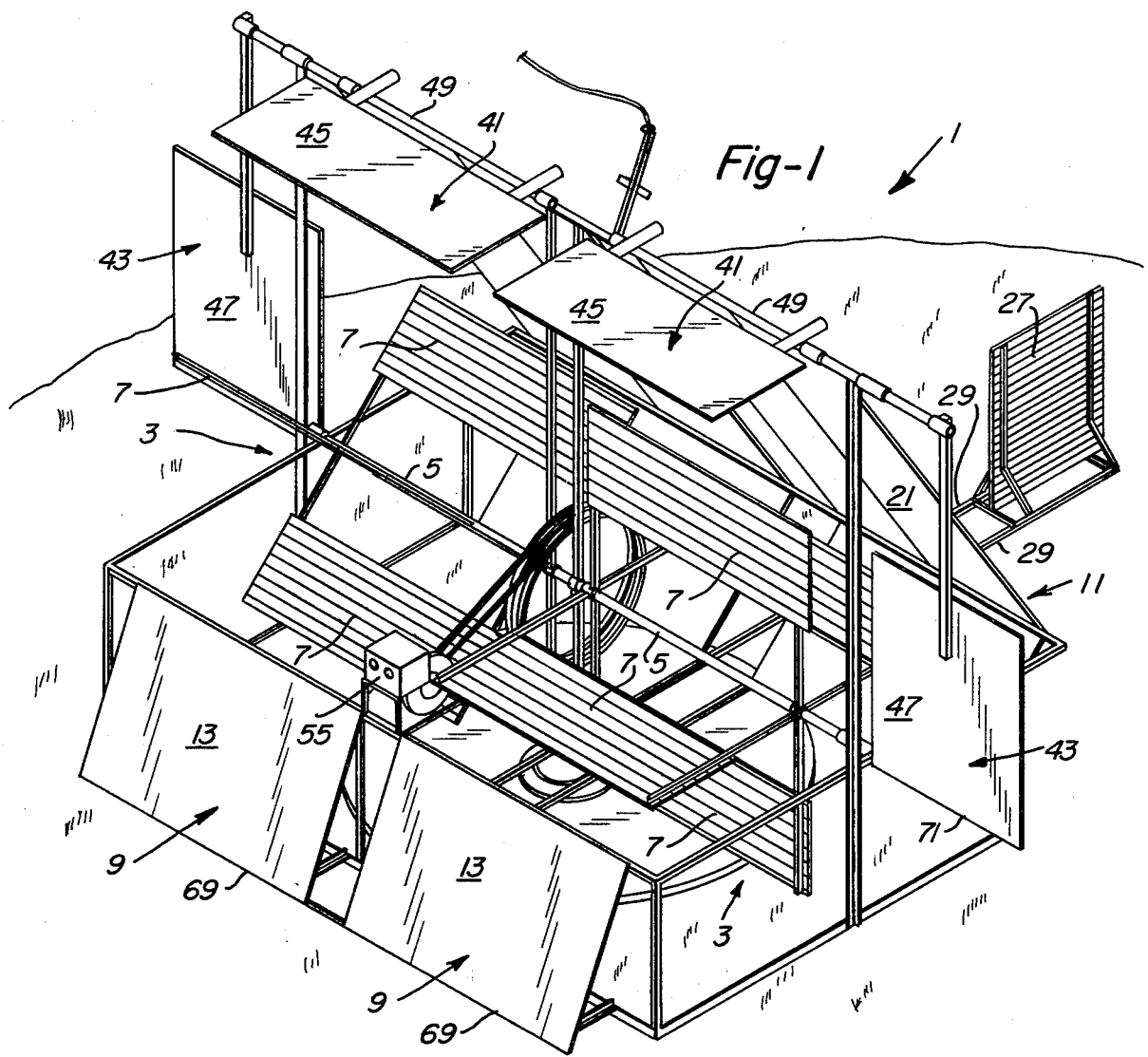
FIG. 1 is a perspective view of the invention illustrating the relationship between the blade assemblies, the directing means, the aligning means, and the power-takeoff means.
Figure 2:
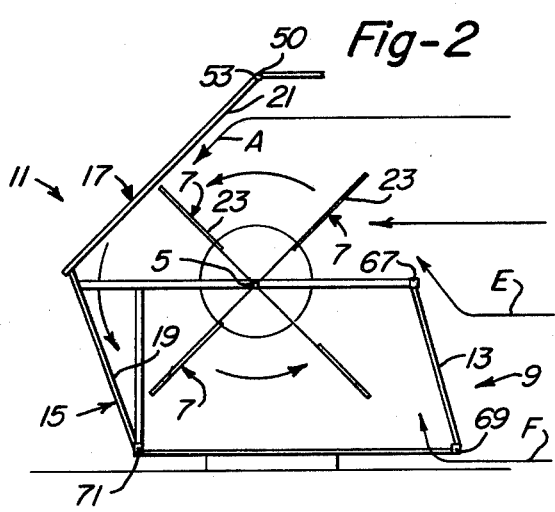
FIG. 2 is a cross sectional view along the axis of rotation of the blade assemblies illustrating how the directing means creates a vortex of whirling winds about the rotational axis.

As best seen in FIGS. 1 and 4, the windmill 1 of the present invention includes a mirror-image pair of blade assemblies 3 mounted for rotation about horizontal axes 5 which are substantially colinear. The blade members 7 of each blade assembly 3 are substantially planar and extend radially outwardly of the respective axis 5. A directing means with front portion 9 and back portion 11 is supported in a fixed relationship to each respective blade assembly 3 and extends substantially thereabout as illustrated in FIGS. 2, 4, and 5. Each directing means serves to channel the incoming wind about the respective axis 5 to create a vortex of whirling winds which strike the blade members 7 and cause them to rotate about a closed path P. The directing means intensifies the driving force of the wind and thereby increase the rotational velocity of the blade members 7 and the efficiency of the windmill 1.

The front portion 9 of each directing means has a planar surface 13 and is supported with the surface 13 spaced from the closed path of the rotating blade member 7 and inclined upwardly toward the rotational axis 5. Back portion 11 of each directing means includes members 15 and 17 which meet to form a substantially concave shape as illustrated in FIGS. 2, 4, and 5. Member 15 has a planar surface 19 which is supported in a substantially parallel relationship with the surface 13 of the front portion 9. Member 17 also has a planar surface 21 which extends upwardly at an angle of approximately 45° to a location above the closed path P of the blade members 7 as seen in FIGS. 2, 4, and 5. The upper section of surface 21 serves to capture a portion of the incoming wind above the closed path of the blade members 7 and deflect it downwardly to strike the surfaces 23 of the blade members 7 at a substantially right angle as illustrated by arrow A in FIG. 2. This captured portion of the incoming wind is deflected by surface 21 to strike the blade members 7 at a location near the circumference of their closed path in order to apply a high torque force thereto. In the preferred embodiment, the upper member 17 of each back portion 11 has a centrally located, vertically extending slot 25 to allow some of the incoming wind to escape therethrough as seen in FIGS. 1 and 4.

Figure 3:
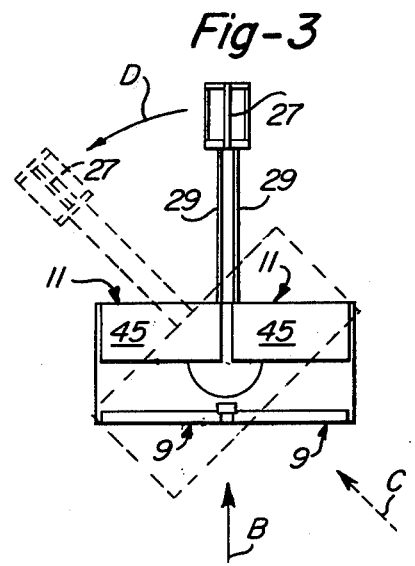
FIG. 3 is an elevated view of the invention showing how the rudder assembly continuously aligns the windmill with the horizontal axis of rotation of the blade assemblies substantially perpendicular to the direction of the incoming wind.
Figure 8:
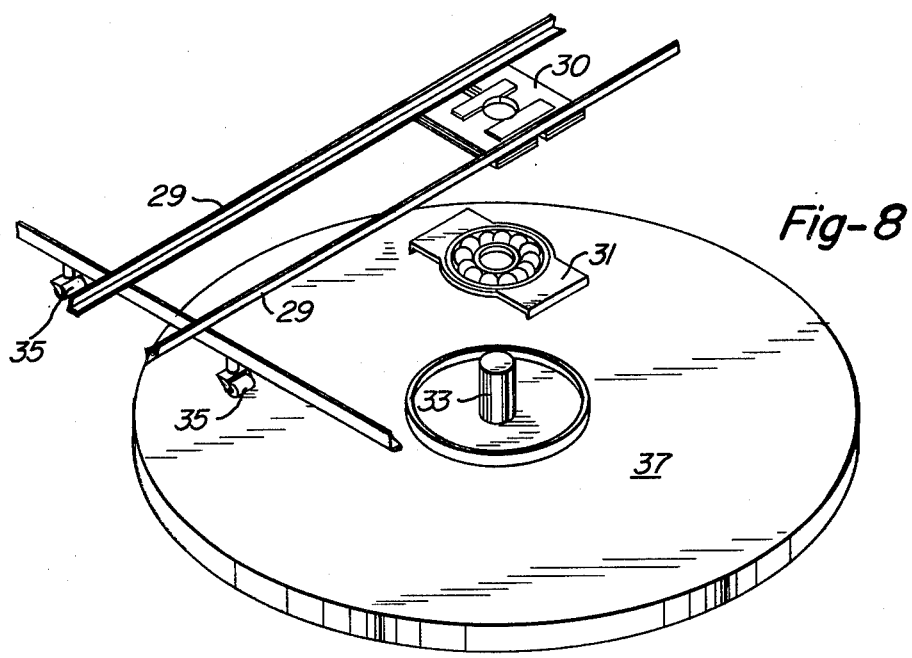
FIG. 8 is an exploded view of the portion of the aligning means on which the windmill is mounted for rotation about a vertical axis.
Figure 9:
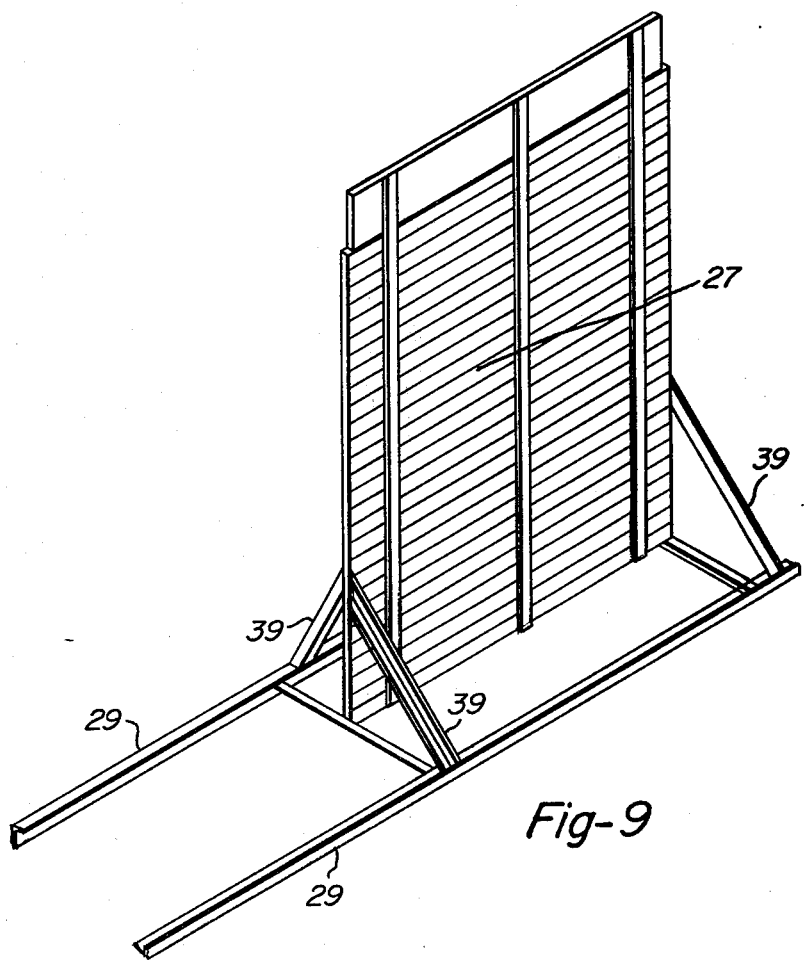
FIG. 9 is a perspective view of the tail rudder of the aligning means of the present invention.

The aligning means for the windmill 1 as shown in FIGS. 1, 3, 4, 8, and 9 includes the tail rudder 27, support members 29, block 30, annular bearing member 31, guide post 33, rollers 35, and annular surface member 37. The entire windmill 1 is supported on annular bearing member 31 and rollers 35 for movement about a vertical axis which extends through the guide post 33. The tail rudder 27 is substantially planar and is mounted by angle iron members 39 to the support members 29 at a substantially right angle to the horizontal axes 5 of the blade assemblies 3. The aligning means serves to continuously align the axes 5 in a direction substantially perpendicular to any incoming wind with the front portions 9 of the directing means upwind thereof and the back portions 11 of the directing means downwind thereof as illustrated in FIG. 3. As the direction of the incoming wind switches from arrow B to dotted arrow C, the aligning means moves the windmill 1 in the direction of arrow D to maintain the axes 5 substantially perpendicular to the direction of the incoming wind.

The windmill 1 is provided with a governor arrangement for each blade assembly 3 which senses the force of the incoming wind and deflects a portion of the wind away from the respective blade assembly 3 when its force rises above a predetermined amount. The governor arrangement serves to protect the blade assemblies 3 and windmill 1 from the destructive force of excessively high winds. The governor arrangement for each blade assembly 3 includes two members 41 and 43 with planar surfaces 45 and 47 and a bar member 49 which is mounted for pivotable movement about a horizontal axis 50. Ring members 51 support the bar member 49 adjacent the upper edge 53 of the back portion 11 of the directing means with its axis of rotation 50 substantially parallel to the axis 5 and upper edge 53. Members 41 and 43 are attached to the bar member 49 with their surfaces 45 and 47 substantially coplanar with the axis 50 and substantially perpendicular to each other as best seen in FIGS. 4–6. Member 43 is positioned along the bar member 49 outwardly of the respective back portion 11 and is biased toward a substantially vertical position. The amount of biasing force can be adjusted as desired by moving the member 43 toward or away from the bar member 49 or by adding or subtracting weight from member 43. As the force of the incoming wind increases above that of the biasing force, the wind striking the surface 47 causes member 41, 43, and 49 to pivot about the horizontal axis 50 to dip surface 45 of member 41 downwardly. As surface 45 dips downwardly, it deflects a portion of the incoming wind above the upper edge 53 and away from the back portion 11 of the directing means. As the force of the incoming winds progressively increases, more and more of the surface 45 is exposed to the incoming wind to progressively deflect a larger portion of the wind away from the directing means and blade assemblies 3. In this manner, the blade assembies 3 and windmill 1 are protected from the destructive force of excessively high winds in a simple and safe manner.

In the preferred embodiment, each rotating blade assembly 3 is used to drive a common electric generator 55 through a power-takeoff arrangement which includes large wheel 57, belt 59, small wheel 61, rotatably mounted shaft 63, wheel 64 and belt 65 as best seen in FIGS. 1, 4, and 7. The electric generator 55 and power-takeoff arrangements are centrally located within the windmill for balance and the directing means 9 and 11 for each blade assembly 3 are spaced from each other along the axes 5 to form a passage therebetween to permit a portion of the wind to pass through.

In operation, the tail rudder 27 continuously aligns the windmill 1 with the horizontal axes 5 of blade assemblies 3 substantially perpendicular to the direction of the incoming wind. The lower portion of the incoming wind striking the planar surface 13 is deflected upwardly as illustrated by arrow E in FIG. 2 to strike the surfaces 23 of the rotating blade members 7 at a substantially right angle and to apply a high torque force thereto. This deflected lower portion combines with the upper portion of the incoming wind to pass through the inlet formed between upper edges 67 and 53 of the front and back portions 9 and 11. As the wind enters the windmill 1 through this inlet, the directing means 9 and 11 for each blade assembly 3 causes it to move about the axis 5 and form a vortex of whirling winds which drive the blade members 7 about the axis 5. Each directing means 9 and 11 intensifies the driving force of the wind and thereby increases the rotational velocity of the respective blade assemblies 3 and efficiency of the windmill 1. The surface 13 of the front portion 9 of the directing means also prevents the incoming wind from striking the blade members 7 as they rotate about the lower half of their closed path P. If desired, some of the incoming wind can be permitted to pass below the front portion 9 and strike the rotating blade members 7 as indicated by arrow F in FIG. 2.

The upper section of surface 21 also deflects a portion of the incoming wind which is above the closed path of the blade member 7 downwardly to strike the blade member 7 at a substantially 90° angle. This deflected portion strikes the blade members 7 near the circumference of their closed path P and applies a high torque force thereto. The directing means 9 and 11 from a open-ended shape and the whirling winds of the vortex can exit from the windmill 1 through these open ends. Each power-takeoff arrangement of 57, 59, 61, 63, 64, and 65 is operably connected to the respective rotating blade assemblies 3 and is driven thereby to run the electric generator 55. Should the incoming wind become excessively high, the governor arrangement 43, 45, and 49 will be pivoted about the horizontal axis 50 to dip the surface 45 of member 43 downwardly and deflect a portion of the incoming wind upwardly away from the blade assemblies 3 and windmill 1. The lower edges 69 and 71 of the front and back portions 9 and 11 of the directing means are spaced from each other and the windmill 1 of the present invention is supported close to the ground so that the ground surface will enhance the creation of the vortex by the directing means 9 and 11. If desired, the windmill 1 could be positioned higher above the ground and a member 68 (see FIGS. 5 and 6) placed between the lower edges 69 and 71 to enhance the vortex created by the directing means 9 and 11 in the same manner as the ground surface does in the preferred embodiment. In this manner, the vortex creating or directing means 9, 11, and either member 68 or the ground (if the windmill is positioned close thereto, then the ground can perform the function of member 68) extends from a first location at 67 upwind and substantially horizontal with rotational axis 5 of the blade members 7 (see FIGS. 5 and 6) to a second location at 50 which is approximately 270° from 67 about axis 5 in a first direction. These first and second locations at 67 and 50 are spaced approximately 90° from each other about the axis 5 in a direction opposite to the first direction and define therebetween an inlet to the vortex creating means. The vortex creating means also has at least one and preferably two open ends spaced from each other along axis 5 whereby the vortex creating means captures the incoming wind entering the inlet between the first and second locations and directs this captured wind about the axis 5 to create a vortex of whirling winds which strike the blade members 7 and exit the vortex creating means substantially along the axis 5 through the two open ends thereof. The windmill 1 of the present invention is extremely strong and is made from angle iron, boards, steel sheets, and other readily available materials. Although the preferred embodiments have blade assemblies that rotate about horizontal axes, it is contemplated that the windmill of the present invention could be turned 90° so that the blade assemblies could rotate about vertical axes if desired.

While several embodiments of the present invention have been described in detail herein, various changes and modifications can be made without departing from the scope of the invention.

I claim:
1. A windmill comprising:
   a plurality of blade members and means for mounting said blade members for rotation about a first, substantially horizontal axis, each of said blade members having a surface extending in a first direction substantially parallel to said first axis and in a second direction substantially perpendicular to said first axis,
   means for continuously aligning said first axis in a direction substantially perpendicular to any incoming wind, and,
   means extending substantially about said first axis and said blade members for directing said incoming wind about said first axis to create a vortex of whirling winds whereby said whirling winds strike said surfaces of said blade members and cause said blade members to rotate about said first axis along a closed path, said directing means including a back portion with a substantially concave shaped surface and means for supporting said back portion in a fixed relationship to and facing said first axis with said substantially concave shaped surface spaced from said closed path of said blade members and extending upwardly higher than the closed path of said blade members, said aligning means aligning said first axis substantially perpendicular to said incoming wind with said back portion downwind thereof, said directing means further including a front portion having a surface and means for supporting said front portion with said surface spaced from said closed path of said blade members and extending downwardly at an angle from a horizontal plane substantially co-planar with said first axis with said surface inclined upwardly toward said first axis, said aligning means aligning said first axis substantially perpendicular to said incoming wind with said front portion upwind thereof, each of said front and back portions of said directing means extending in a direction substantially parallel to said first axis and together forming a shape having two open ends spaced from each other along said first axis, said whirling winds of said vortex being able to exit said windmill through said open ends, said front and back portions having upper edges spaced from each other whereby an inlet for the incoming wind is defined between said upper edges of said front and back portions of said directing means and a major portion of said incoming wind is directed by said front and back portions to strike said blade members at a location above said horizontal plane as said blade members move along said closed path, and each of said front and back portions further having a lower edge with said lower edges being spaced from each other whereby a portion of said incoming wind can pass between said spaced apart lower edges and strike said blade member as said blade members move along said closed path.

2. A windmill comprising:
a plurality of blade members and means for mounting said blade members for rotation about a first, substantially horizontal axis, each of said blade members having a surface extending in a first direction substantially parallel to said first axis and in a second direction substantially perpendicular to said first axis,
means for continuously aligning said first axis in a direction substantially perpendicular to any incoming wind, and,
means extending substantially about said first axis and said blade members for directing said incoming wind about said first axis to create a vortex of whirling winds whereby said whirling winds strike said surfaces of said blade members and cause said blade members to rotate about said first axis along a closed path, said directing means including a back portion with a substantially concave shaped surface and means for supporting said back portion in a fixed relationship to and facing said first axis with said substantially concave shaped surface spaced from said closed path of said blade members and extending upwardly higher than the closed path of said blade members, said back portion having an upper, planar section extending upwardly higher than said closed path, said planar section being inclined at a substantially 45° angle to the vertical whereby a part of the incoming wind above said closed path is captured and deflected downwardly by said such planar section to strike the surfaces of said blade members at a substantially 90° angle, said aligning means aligning said first axis substantially perpendicular to said incoming wind with said back portion downwind thereof, said directing means further including a front portion having a surface and means for supporting said front portion with said surface spaced from said closed path of said blade members and extending downwardly at an angle from a horizontal plane substantially co-planar with said first axis with said surface inclined upwardly toward said first axis, said aligning means aligning said first axis substantially perpendicular to said incoming wind with said front portion upwind thereof, each of said front and back portions of said directing means extending in a direction substantially parallel to said first axis and together forming a shape having two open ends spaced from each other along said first axis, said whirling winds of said vortex being able to exit said windmill through said open ends, and said front and back portions having upper edges spaced from each other whereby an inlet for the incoming wind is defined between said upper edges of said front and back portions of said directing means and a major portion of said incoming wind is directed by said front and back portions to strike said blade members at a location above said horizontal plane as said blade members move along said closed path.

3. The windmill of claim 2 wherein each of said surfaces of said blade members extends in a direction substantially radially outwardly of said first axis for a first, substantially common distance and said planar section of said back portion deflects said part of the incoming wind to strike said blade surfaces at a location thereon slightly less than said first distance to create a high torque force on said blade members.

4. A windmill comprising:
a plurality of blade members and means for mounting said blade members for rotation about a first, substantially horizontal axis, each of said blade members having a surface extending in a first direction substantially parallel to said first axis and in a second direction substantially perpendicular to said first axis,
means for continuously aligning said first axis in a direction substantially perpendicular to any incoming wind, and,
means extending substantially about said first axis and said blade members for directing said incoming wind about said first axis to creat a vortex of whirling winds whereby said whirling winds strike said surfaces of said blade members and cause said blade members to rotate about said first axis along a closed path, said directing means including a back portion with a substantially concave shaped surface and means for supporting said back portion in a fixed relationship to and facing said first axis with said substantially concave shaped surface spaced from said closed path of said blade members and extending upwardly higher than the closed path of said blade members, said aligning means aligning said first axis substantially perpendicular to said incoming wind with said back portion downwind thereof, said directing means further including a front portion having a surface and means for supporting said front portion with said surface spaced from said closed path of said blade members and extending downwardly at an angle from a horizontal plane substantially co-planar with said first axis with said surface inclined upwardly toward said first axis, said substantially concave shaped surface of said back portion having upper and lower surface sections, said lower surface section extending downwardly at an angle from said horizontal plane, said lower surface section of said back portion and said surface of said front portion being substantially parallel, said aligning means aligning said first axis substantially perpendicular to said incoming wind with said front portion upwind thereof, each of said front and back portions of said directing means extending in a direction substantially parallel to said first axis and together forming a shape having two open ends spaced from each other along said first axis, said whirling winds of said vortex being able to exit said windmill through said open ends, and said front and back portions having upper edges spaced from each other whereby an inlet for the incoming wind is defined between said upper edges of said front and back portions of said directing means and a major portion of said incoming wind is directed by said front and back portions to strike said blade members at a location above said horizontal plane as said blade members move along said closed path.

5. The windmill of claim 4 wherein said lower surface section of said back portion and said surface of said front portion are substantially planar.

6. The windmill of claim 5 wherein said upper surface section of said back portion is substantially planar.

7. A windmill comprising:
a plurality of blade members and means for mounting said blade members for rotation about a first, substantially horizontal axis, each of said blade members having a surface extending in a first direction substantially parallel to said first axis and in a second direction substantially perpendicular to said first axis, means for continuously aligning said first axis in a direction substantially perpendicular to any incoming wind, and, means extending substantially about said first axis and said blade members for directing said incoming wind about said first axis to create a vortex of whirling winds whereby said whirling winds strike said surfaces of said blade members and cause said blade members to rotate about said first axis along a closed path, said directing means including a back portion with a substantially concave shaped surface and means for supporting said back portion in a fixed relationship to and facing said first axis with said substantially concave shaped surface spaced from said closed path of said blade members and extending upwardly higher than the closed path of said blade members, said aligning means aligning said first axis substantially perpendicular to said incoming wind with said back portion downwind thereof, said directing means further including a front portion having a surface and means for supporting said front portion with said surface spaced from said closed path of said blade members and extending downwardly at an angle from a horizontal plane substantially co-planar with said first axis with said surface inclined upwardly toward said first axis, said aligning means aligning said first axis substantially perpendicular to said incoming wind with said front portion upwind thereof, each of said surfaces of said blade members extending in a direction substantially radially outwardly of said first axis for a first, substantially common distance and said surface of said front portion deflects a part of the incoming wind to strike said blade surfaces at a location thereon slightly less than said first distance and at a substantially 90° angle to the surfaces of said blade members to create a high torque on said blade members, each of said front and back portions of said directing means extending in a direction substantially parallel to said first axis and together forming a shape having two open ends spaced from each other along said first axis, said whirling winds of said vortex being able to exit said windmill through said open ends, and said front and back portions having upper edges spaced from each other whereby an inlet for the incoming wind is defined between said upper edges of said front and back portions of said directing means and a major portion of said incoming wind is directing by said front and back portions to strike said blade members at a location above said horizontal plane as said blade members move along said closed path.

8. A windmill comprising:
a plurality of blade members and means for mounting said blade members for rotation about a first, substantially horizontal axis, each of said blade members having a surface extending in a first direction substantially parallel to said first axis and in a second direction substantially perpendicular to said first axis, means for continuously aligning said first axis in a direction substantially perpendicular to any incoming wind, means extending substantially about said first axis and said blade members for directing said incoming wind about said first axis to create a vortex of whirling winds whereby said whirling winds strike said surfaces of said blade members and cause said blade members to rotate about said first axis along a closed path, said directing means includes a back portion with a substantially concave shaped surface and means for supporting said back portion in a fixed relationship to and facing said first axis with said substantially concave shaped surface spaced from said closed path of said blade members, said substantially concave shaped surface of said back portion extending upwardly to an upper edge, said upper edge being substantially parallel to said first axis and higher than said closed path of said blade members, said aligning means aligning said first axis substantially perpendicular to said incoming wind with said back portion downwind thereof, and, said windmill further including means for selectively deflecting a portion of said incoming wind upwardly above said upper edge of said back portion and away from said back portion in response to variations in the force of the incoming wind, said deflecting means including a support member and means for mounting said support member for pivotal movement about an axis, said pivotal axis being substantially parallel to said first axis and positioned adjacent said upper edge, said deflecting means further including first and second members, each of said first and second members having a substantially planar surface, and means for attaching said first and second members to said support member with said surfaces thereof substantially co-planar with said pivotal axis and at an angle of approximately 90° to each other, said first member being positioned along said support member adjacent the upper edge of said back portion and said second member being positioned along said support member at a location outwardly of said back portion in the direction of said first axis, means for biasing said first and second members with said planar surface of said second member extending substantially vertically and said planar section of said first member extending substantially horizontally whereby said incoming wind strikes the planar surface of said second member and causes said deflecting means to pivot about said pivotal axis to dip the planar surface of said first member downwardly and deflect said portion of the incoming wind above said upper edge of said back portion and away from said back portion when the force of the incoming wind increases above the force of said biasing means, said deflecting means exposing incrementally more area of the surface of said first member to said incoming wind as the force thereof increases to incrementally deflect more of the incoming wind upwardly away from said back portion and said blade members.

9. A windmill comprising:

a plurality of blade members and means for mounting said blade members for rotation about a first, substantially horizontal axis, each of said blade members having a surface extending in a first direction substantially parallel to said first axis and in a second direction substantially perpendicular to said first axis, means for continuously aligning said first axis in a direction substantially perpendicular to any incoming wind, means extending substantially about said first axis and said blade members for directing said incoming wind about said first axis to create a vortex of whirling winds whereby said whirling winds strike said surfaces of said blade members and cause said blade members to rotate about said first axis along a closed path, said directing means includes a back portion with a substantially concave shaped surface and means for supporting said back portion in a fixed relationship to said first axis with said substantially concave shaped surface spaced from said closed path of said blade members and facing said first axis, said aligning means aligning said first axis substantially perpendicular to said incoming wind with said back portion downwind thereof, and a second plurality of blades, second mounting means, and second directing means substantially identical to said first plurality of blade members, first mounting means, and first directing means and positioned in a substantially mirror relationship thereto with said respective first axis substantially colinear, said aligning means continuously aligning said respective first axes substantially perpendicular to said incoming wind, said respective directing means of said first and second plurality of blade members being spaced from each other in the direction of said colinear first axes to create a passage therebetween for a portion of said incoming wind, and power-takeoff means, said power-takeoff means including at least a first member and means for operably connecting said first member to at least one of said first and second plurality of blade members for rotation therewith, a second member, and means operably connecting said second member to said first member for rotation therewith.

* * * * *